United States Patent [19]

Shekhawat et al.

[11] Patent Number: 4,670,828
[45] Date of Patent: Jun. 2, 1987

[54] BI-DIRECTIONAL SWITCH FOR NEUTRAL POINT CLAMPED PWM INVERTER

[75] Inventors: Sampat S. Shekhawat; P. John Dhyanchand; Pierre Thollot, all of Rockford, Ill.

[73] Assignee: Sundstrand Corporation, Rockford, Ill.

[21] Appl. No.: 833,103

[22] Filed: Feb. 25, 1986

[51] Int. Cl.$^4$ ............................................ H02H 7/122
[52] U.S. Cl. ...................................... 363/56; 363/98; 363/132
[58] Field of Search ...................... 363/39, 40, 41, 56, 363/131, 132, 133, 135, 136, 96, 97, 98; 361/91, 113

[56] References Cited

U.S. PATENT DOCUMENTS

| | | | |
|---|---|---|---|
| 3,286,155 | 11/1966 | Corey | 363/41 |
| 3,641,417 | 2/1972 | Gyugyi | 363/39 |
| 4,339,791 | 7/1982 | Mitchell | 363/41 |
| 4,443,841 | 4/1984 | Mikami et al. | 363/41 |
| 4,463,400 | 7/1984 | Paice et al. | 361/5 |
| 4,564,895 | 1/1986 | Glennon | 363/41 |

OTHER PUBLICATIONS

"New Format Step-wave Output Inverter", Akira Naniwae, Isao Takahashi, Yasunobu Akagi, Nagaoka Institute of Science and Technology.

Primary Examiner—Patrick R. Salce
Assistant Examiner—Emanuel Todd Voeltz
Attorney, Agent, or Firm—Wood, Dalton, Phillips, Mason & Rowe

[57] ABSTRACT

Bi-directional switches for use with neutral point clamped PWM inverters have utilized clamping switches which are operated alternately with main power switches in the inverter to periodically connect an output terminal of the inverter to a neutral voltage. However, a delay period is typically interposed between turn-off of a main power switch and turn-on of the clamping switch to minimize the possibility of a potentially destructive shoot-through condition. This delay adversely affects the quality of the power developed by the inverter and leads to an undesired increase in the size of snubber circuits coupled across the power switches. In order to overcome these problems, a bi-directional switch according to the present invention includes circuitry for providing a high impedance path in series circuits including the main power switches and the clamping switch so that shoot-through currents are blocked even when one of the main power switches and the clamping switch are simultaneously on. The delays between turn-off of a main power switch and turn-on of the clamping switch can thereby be reduced or eliminated, thereby resulting in improved quality of the output power of the inverter and a reduction in the size of snubber circuits used therein.

23 Claims, 6 Drawing Figures

BI-DIRECTIONAL SWITCH FOR NEUTRAL POINT CLAMPED PWM INVERTER

DESCRIPTION

1. Technical Field

The present invention relates generally to power switching circuits, and more particularly to a bi-directional switch for use in a neutral point clamped pulse width modulated (PWM) inverter.

2. Background Art

Conventional PWM inverters for converting DC power into AC power have included first and second main power switches which are coupled in series across positive and negative power terminals of a DC power supply. The switches are controlled to alternately conduct current to an output at a load coupled to a junction between the switches. This operation causes the voltage appearing at the output to switch between the voltages at the positive and negative terminals, thereby resulting in a high degree of undesired harmonics in the output.

In order to reduce the magnitude of undesired harmonic currents, neutral point clamped PWM inverters have been designed wherein the output of the inverter is periodically connected to a neutral terminal which is at a voltage midway between the voltages at the positive and negative terminals by the power source. This connection is accomplished by means of a bi-directional switch which is capable of conducting current in two directions and which is operated so that the output voltage swing is limited to one-half the difference between the voltages appearing at the positive and negative terminals.

One problem that has been encountered in both types of inverters is shorting of the power source. Shorting can occur when two of the switches in the inverter are simultaneously on, thereby connecting one of the power terminals to the other power terminal or the neutral terminal. As a practical matter, in a neutral point clamped PWM inverter, one of the main power switches is operated alternately with the bi-directional switch, and hence shorting (or, "shoot-through") is more likely to occur from one power terminal to the neutral terminal than from one power terminal to the other.

Prior attempts at reducing the possibility of shoot-through have relied upon the introduction of delays between turn-off of one switch and turn-on of another switch so that simultaneous conduction is prevented. However, the use of delays introduces undesired harmonics in the output of the inverter and results in the need for undesirably large snubber circuits coupled across the switches.

DISCLOSURE OF INVENTION

In accordance with the present invention, a bi-directional switch for use in a neutral point clamped PWM inverter minimizes the incidence of shoot-through and yet does not result in a substantial increase in snubber size.

The switch of the present invention is particularly adapted for use in a neutral point clamped PWM inverter which develops alternating current output power comprising alternating first and second voltage and current half-cycles, wherein the inverter includes a pair of series-connnected main power switches coupled across first and second voltages developed by a DC power supply. The first main power switch is intermittently operated in each first voltage half-cycle of the output power to develop a first series of pulses at an output between the main power switches and the second main power switch is intermittently operated in each second voltage half-cycle of the output power to develop a second series of pulses at the output. The bi-directional switch includes a clamping switch having a control electrode and main current path electrodes coupled between the output and a neutral voltage and means coupled to the control electrode of the clamping switch for operating the clamping switch between pulses in the first and second series of pulses to intermittently connect the inverter output to the neutral voltage so that the stored energy in the load freewheels therebetween. Means are coupled to the clamping switch for providing a high impedance path between the first voltage and the neutral voltage and between the second voltage and the neutral voltage so that shorting of the power supply is avoided even when one of the main power switches and the clamping switch are simultaneously on.

In the preferred embodiment, the providing means comprises a first controlled switch coupled between the output and one main current path electrode of the clamping switch, a second controlled switch coupled between the neutral voltage and the one main current path electrode of the clamping switch, a first diode coupled between the output and the other main current path electrode of the clamping switch and a second diode coupled between the neutral voltage and the other main current path electrode of the clamping switch.

The controlled switches are operated such that one of these switches is off in each current half-cycle to prevent shoot-through currents from flowing between the terminals of the power supply and the neutral voltage. As a result, time delays between turn-off of one main power switch and turn-on of the clamping switch, or vice versa, may be reduced or eliminated, in turn improving the quality of the output power developed by the inverter and permitting a reduction in the size of snubber circuits connected across the switches.

BEST MODE FOR CARRYING OUT THE INVENTION

Figure 1:
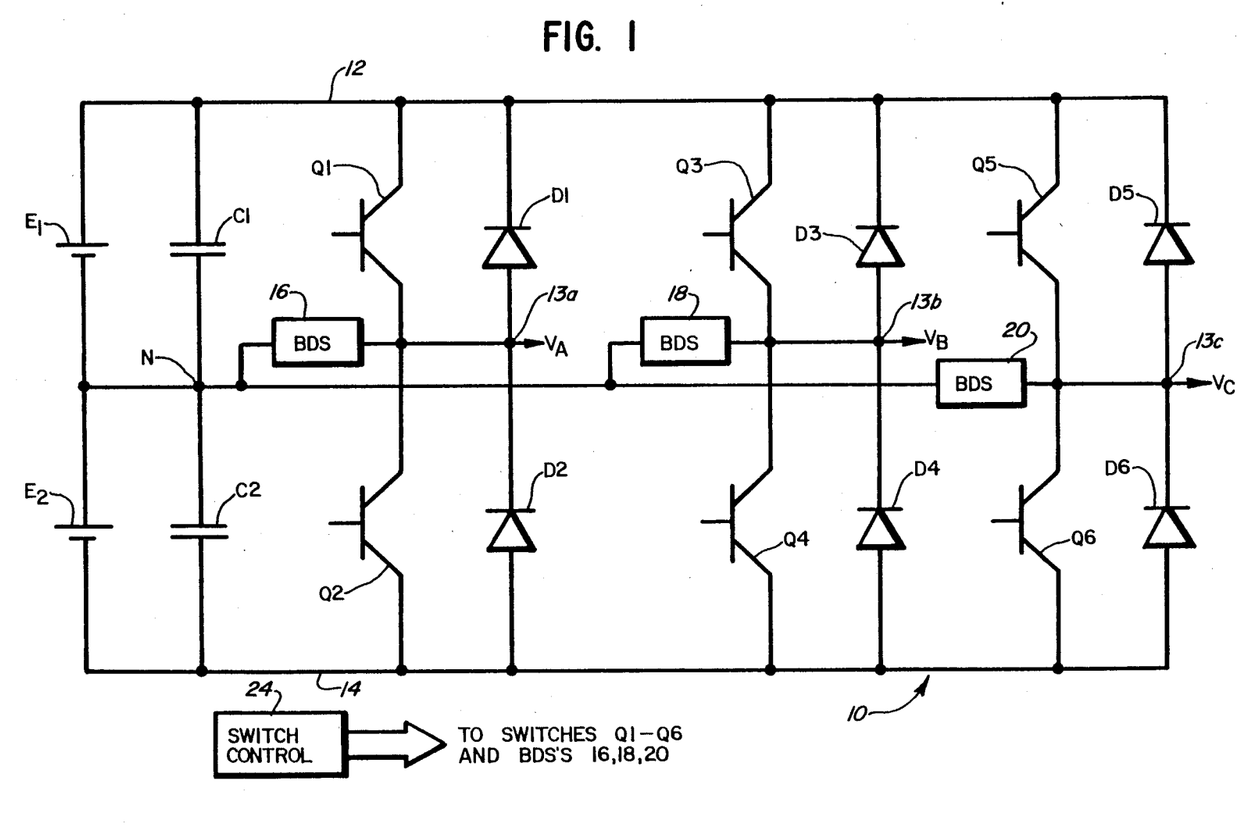
FIG. 1 is a combined schematic and block diagram of a neutral point clamped PWM inverter utilizing a bi-directional switch.

Referring now to FIG. 1, there is illustrated a three-phase neutral point clamped PWM inverter 10 for converting DC power developed by a power supply comprising first and second series-connected DC sources $E_1$ and $E_2$ into AC power for energizing an AC load (not shown in FIG. 1). The inverter includes three pairs of main power switches Q1-Q6 coupled across main power buses 12,14 which are in turn coupled to positive and negative power terminals of the DC supply. Flyback diodes D1-D6 are coupled in anti-parallel relationship across the main power switches Q1-Q6 to provide paths for reactive currents, as is conventional.

Phase outputs $V_A$, $V_B$, $V_C$ are developed at junctions 13a-13c, respectively, between the switches of each pair. The junctions 13a-13c are coupled by bi-directional switches 16,18,20, respectively, to a neutral voltage appearing at a junction N between first and second smoothing capacitors C1,C2 and between the first and second power sources $E_1$, $E_2$. The neutral voltage is midway between the voltages on the power buses 12,14.

With particular reference to the inverter phase including switches Q1,Q2, diodes D1,D2 and bi-directional switch 16, a switch control circuit 24 alternately operates the switches Q1 and 16 in a PWM mode of operation in a first half-cycle of the inverter phase output voltage while the switch Q2 is maintained in an off state. Conversely, in a second half-cycle of the inverter phase output voltage, the switches Q2 and 16 are alternately operated while the switch Q1 is held in the off state.

Figure 2:
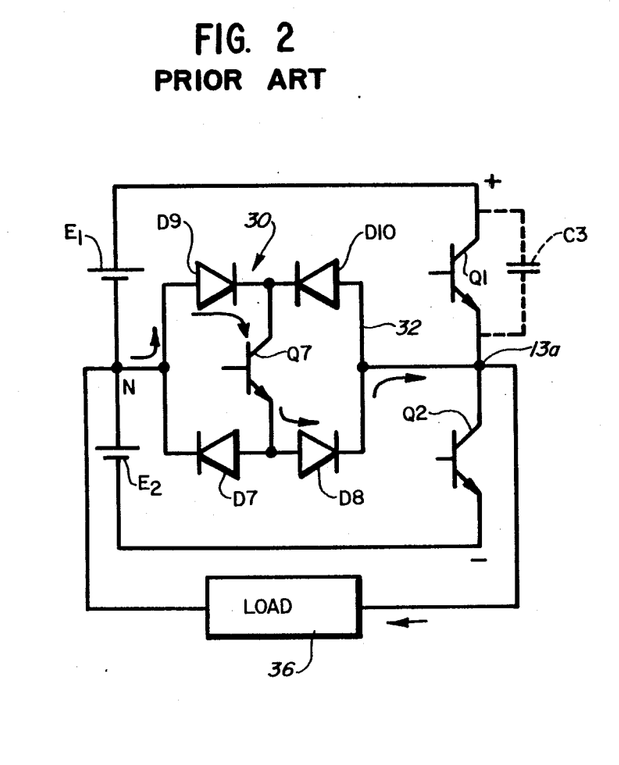
FIG. 2 is a combined simplified schematic and block diagram of a portion of the inverter of FIG. 1 utilizing a prior art bi-directional switch.

Referring now to FIG. 2, there is illustrated a prior art bi-directional switch 30 in conjunction with one phase of the inverter shown in FIG. 1. The capacitors C1,C2 and the diodes D1,D2 are not shown in FIG. 2 for purposes of simplicity.

The prior art bi-directional switch 30 comprises first through fourth diodes D7-D10 which are coupled in first through fourth arms of a bridge 32. A first vertex at the junction between the cathode of the diode D7 and the anode of the diode D9 is coupled to the neutral terminal N. A second vertex at the junction between the cathode of the diode D8 and the anode of the diode D10 is coupled to the junction 13a.

Coupled across third and fourth vertices of the bridge 32 are first and second main current path electrodes of a neutral or clamping switch Q7.

A load 36 is coupled between the output 13a and the neutral terminal N.

During each first half-cycle of the inverter output voltage, the switch Q1 is intermittently operated to produce a series of pulses of a first or positive polarity. Between the pulses of the first polarity, the switch Q7 is turned on to clamp the voltage at the output terminal 13a to the neutral voltage. As previously noted, the switch Q2 is off during this time.

In each second half-cycle of the inverter output voltage, the switch Q2 is intermittently operated to produce a series of pulses of a second or negative polarity. In the intervals between these pulses, the switch Q7 is operated to again clamp the output terminal 34 to the neutral voltage.

During such operation, should the switches Q1 and Q7 or Q2 and Q7 be on simultaneously, a shoot-through condition will occur whereby one of the power sources $E_1$ or $E_2$ is shorted. More particularly, taking a portion of the first half-cycle of the inverter output voltage as an example, load current in the direction of the arrow adjacent the load 36 is supplied either by conduction of the switch Q1 or by current supplied from the neutral terminal N through the diode D9, the switch Q7 and the diode D8 to the output terminal 34, as indicated by the arrows adjacent these elements. However, if a shoot-through condition should occur wherein the switches Q1 and Q7 are on simultaneously, the positive terminal of the voltage source $E_1$ is coupled through the transistor Q1, the diode D10, the transistor Q7 and the diode D7 to the neutral terminal N. The relatively low voltage drops across these components results in a large magnitude of current which may cause destruction of the power supply and/or inverter components.

In the prior art circuit shown in FIG. 2, the possibility of shoot-through may be minimized by interposing a short delay between turn-off of the transistor Q1 and turn-on of the transistor Q7, and vice versa. This delay is selected to be sufficiently short to result in minimal disruption in the output waveform of the inverter yet long enough to ensure, for example, that both of the main power switches Q1,Q2 are fully off before the transistor Q7 begins to turn on.

However, such delays inevitably create undesired harmonics in the inverter output. Also, the size of snubber circuits coupled across the main power switches, such as that represented by the capacitor C3 illustrated in dotted line form in FIG. 2 coupled across the transistor Q1, must be undesirably large to handle the currents to be supplied to the load 36 in the interval between turn-off of the transistor Q1 and turn-on of the switch Q7.

Figure 3:
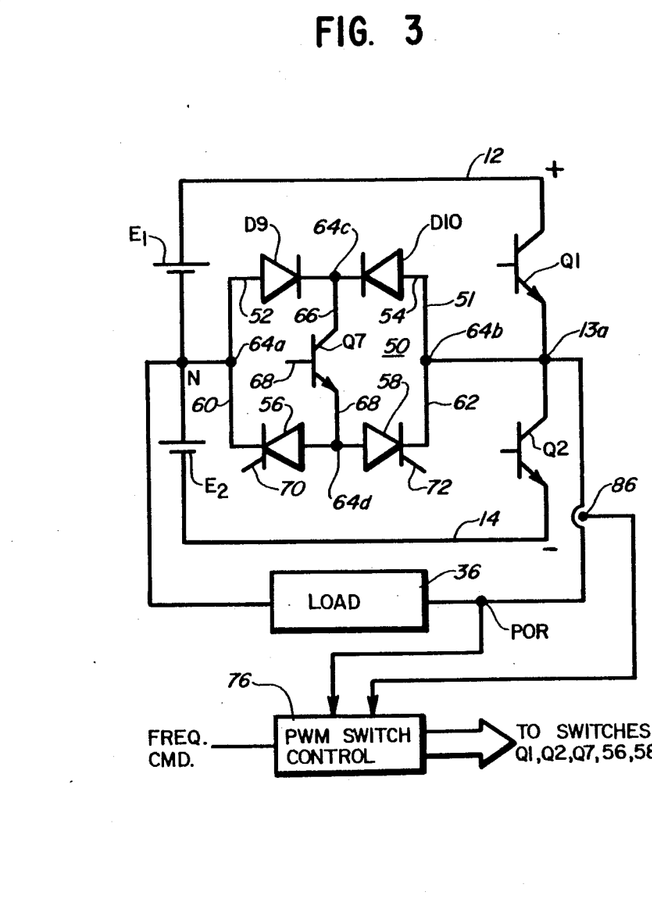
FIG. 3 is a combined simplified schematic and block diagram of a portion of the inverter of FIG. 1 in conjunction with the bi-directional switch of the present invention.

With reference now to FIG. 3, the above problems are overcome by use of a bi-directional switch 50 according to the present invention. Elements common to FIGS. 2 and 3 are assigned like reference numerals. Again, as was noted in connection with FIG. 2, the schematic of FIG. 3 is simplified in nature, i.e. only one phase of the inverter is illustrated, since the switch of the present invention is equally adapted for use with single or polyphase inverters. Also, the flyback diodes and filter capacitors are not shown.

The bi-directional switch includes a bridge 51 having first and second diodes, comprising the diodes D9 and D10 disclosed in connection with FIG. 2, coupled in first and second arms 52,54 of the bridge. First and second controlled switches 56,58 are connected in third and fourth arms 60,62 respectively, of the bridge. The controlled switches 56,58 may be SCR's or other switches, such as bipolar transistors.

The bridge further includes first through fourth vertices 64a-64d, respectively. The first vertex is coupled to the neutral terminal N while the second vertex 64b is coupled to the output terminal 13a of the inverter. The neutral or clamping switch Q7, which may be a bipolar or MOSFET transistor, includes a pair of main current path electrodes 66,68 which are coupled to the third and fourth vertices 64c,64d of the bridge.

A control electrode 69 of the neutral or clamping switch Q7 and control electrodes 70,72 of the first and second controlled switches 56,58, respectively, are coupled to a PWM switch control circuit 76. The switch control circuit 76 is also coupled to and controls the main power switches Q1 and Q2 of the inverter.

The switch control circuit 76 may be any type of PWM neutral point clamped switch control which is capable of generating appropriate control signals to operate the main power switches Q1 and Q2 and the neutral switch Q7. In the preferred embodiment, the switch control 76 is that disclosed and claimed in Shekhawat et al, U.S. patent application Ser. No. 672,305, filed Nov. 16, 1984, entitled "Control for a Neutral Point Clamped PWM Inverter", assigned to the assignee of the instant application and the disclosure of which is hereby incorporated by reference.

Figure 4:
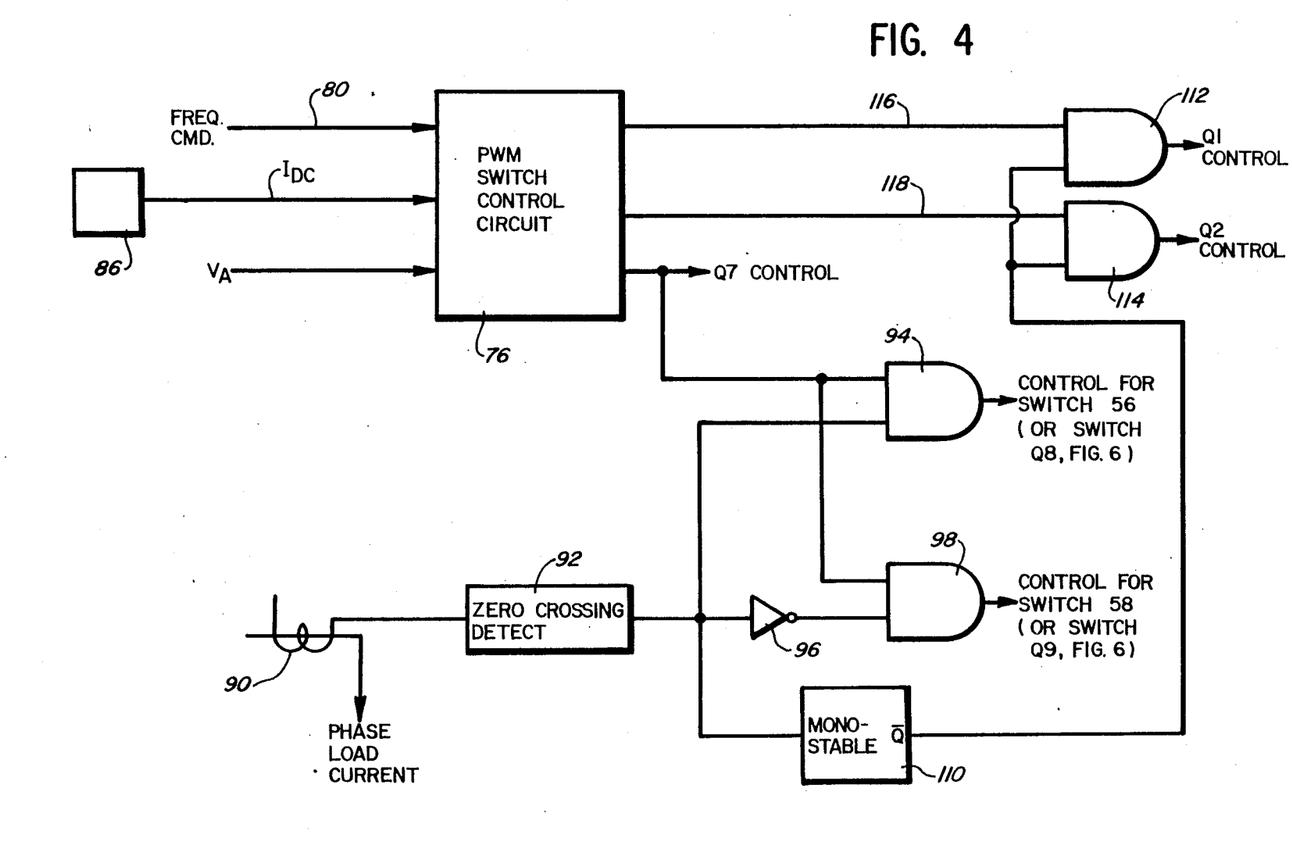
FIG. 4 is a block diagram of control circuitry for controlling the switches shown in FIG. 3.

Briefly, and with reference also to FIG. 4, the switch control circuit 76 is responsive to a frequency command signal on a line 80 which establishes the fundamental frequency of the output power of the inverter. The switch control circuit also receives a signal representing the current in the load flowing to or from the output terminal 13a, FIG. 3, as developed by a current sensor 86 and a signal representing the output voltage $V_A$ of the inverter as detected at a point of regulation (POR) near the load 36.

The switch control circuit 76 develops appropriate control signals for the switches Q1, Q2 and Q7 in response to these inputs to maintain the inverter output at or near specified parameter limits.

Figure 5:
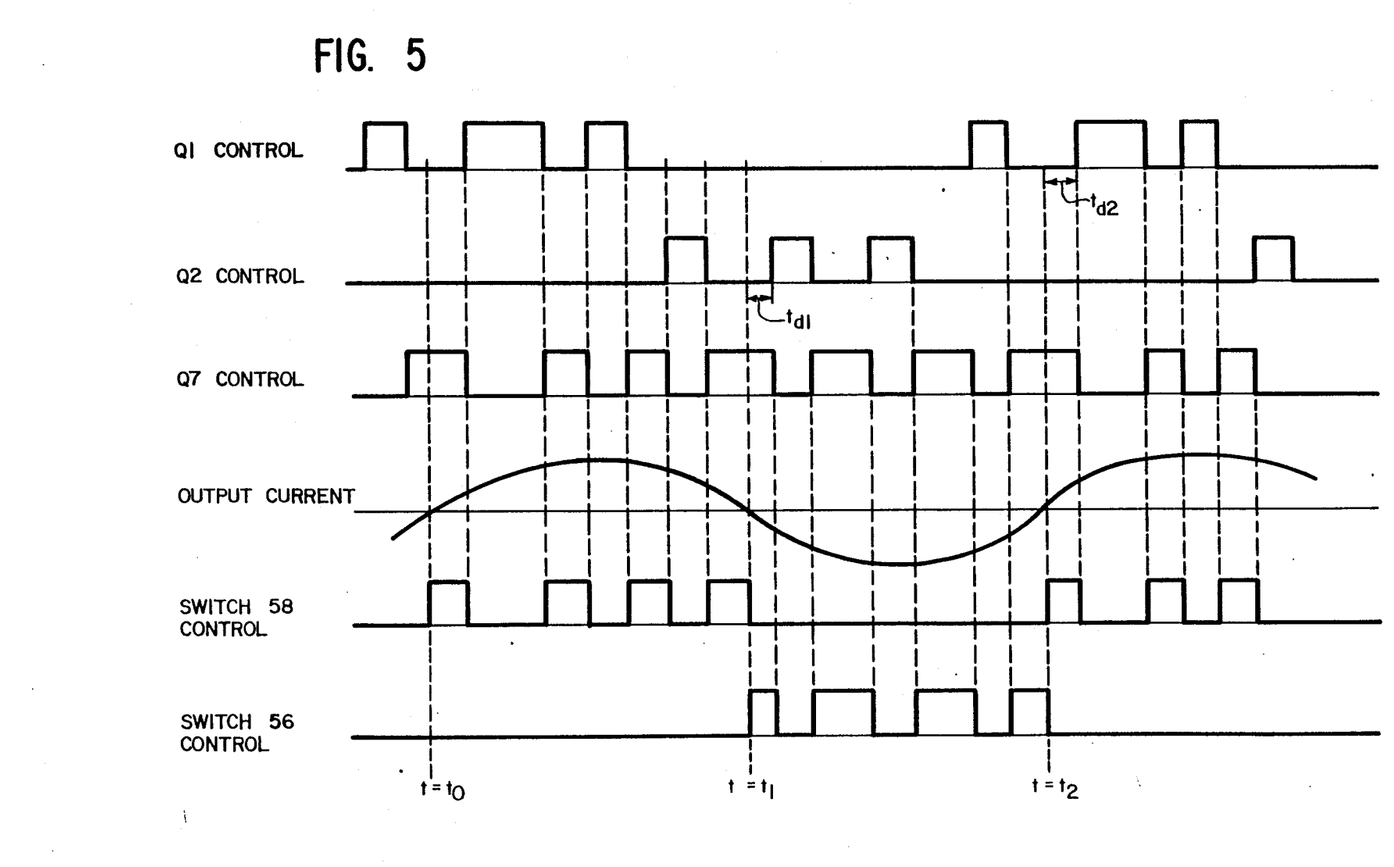
FIG. 5 is a series of waveform diagrams illustrating the operation of the circuitry shown in FIG. 3.

Referring also to the waveform diagrams of FIG. 5, the switch control circuit intermittently operates the main power switches Q1,Q2 in alternating half-cycles of the inverter output voltage such that a first series of pulses of positive polarity are created in each first half-cycle of the inverter output voltage and a second series of pulses of negative polarity are created in second half-cycles of the inverter output voltage.

It should be noted that the waveforms shown in FIG. 5 assume that the load is highly inductive, and hence the half-cycles of the inverter output current are displaced in time relative to the voltage half-cycles.

As can be seen in the waveform diagrams of FIG. 5, the neutral or clamping switch Q7 is operated between pulses in both half-cycles of the inverter output voltage. If desired, a short delay may be interposed between turn-off of one of the main power switches Q1,Q2 and turn-on of the clamping switch Q7, and vice versa. Alternatively, this delay may be eliminated, if desired, due to the provision of a high impedance path between the first and second voltages developed by the power sources $E_1$, $E_2$ and the neutral voltage which ensures that shorting of the power sources is avoided even when one of the main power switches Q1,Q2 and the clamping switch Q7 are simultaneously on. This high impedance path is provided by the controlled switches 56,58, and the diodes D9 and D10.

More specifically, one of the controlled switches 56,58 is operated simultaneously with the clamping switch Q7 while the remaining switch 56,58 is maintained in the off state. That is, in the first half-cycle of the inverter output current between times $t=t_0$ and $t=t_1$, the switch 58 is operated simultaneously with the clamping switch Q7 so that a path is provided for load current exiting the output terminal 13a to the load 36. Shoot-through is prevented by the nonconductive switch 56.

At the moment of current reversal between current half-cycles at time $t=t_1$, the switch 58 is turned off and the switch 56 is turned on to provide a path for current passing from the load 36 through the diode D10, the switch Q7 and the switch 56 to the neutral terminal N.

In the second half-cycle of the inverter output current between times $t=t_1$ and $t=t_2$, the switches Q7 and 56 are operated simultaneously to provide a path for load current to the neutral terminal N. Shorting of the power supply is prevented during this interval by the nonconductive switch 58. At the instant of current reversal at time $t=t_2$, the first controlled switch 56 is turned off and the second controlled switch 58 is turned on to accommodate the change in load current direction.

Furthermore, for predetermined delay periods following the points at which current reversal takes place, the operation of the switches Q1 and Q2 is inhibited. These delay periods, represented by the times $t_{d1}$ and $t_{d2}$ may be equal or may be different, as desired. These delay periods ensure that shoot-through caused by simultaneous conduction of the clamping switch Q7, one of the main power switches Q1,Q2 and one of the controlled switches 56,58 does not occur. This delay may be necessary only in the event the controlled switches 56,58 are SCR's, since SCR's have a finite recovery time which can cause an SCR to conduct for short intervals following removal of gate drive therefrom.

On the other hand, if the controlled switches 56, 58 comprise bipolar transistors, the delay periods $t_{d1}$ and $t_{d2}$ can be substantially reduced or eliminated, since these types of switches turn off quickly and hence the possibility of shoot-through is substantially reduced.

With reference again to FIG. 4, the control signal for the switch 56 is obtained by means of a current transformer 90 which senses the load current, a zero crossing detector 92 and an AND gate 94 which has a first input coupled to the output of the zero crossing detector 92 and a second input which receives the Q7 control signal from the switch control circuit 76.

The control signal for the switch 58 is derived by an inverter 96 which inverts the output of the zero crossing detector 92 and a second AND gate 98 having a first input coupled to the output of the inverter 96 and a second input which receives the control signal for the switch Q7.

The outputs of the first and second AND gates 94, 98 may be coupled to suitable amplifier circuits which provide the proper levels for operating the first and second controlled switches 56,58.

The delay periods are interposed by delay circuitry including a one shot or monostable 110 and AND gates 112, 114. The input of monostable 110 is coupled to the output of the zero crossing detector 92 and the $\overline{Q}$ output thereof is coupled to first inputs of the AND gates 112,114. A second input of the AND gate 112 receives a Q1 PWM signal on a line 116 from the switch control circuit 76. A second input of the AND gate 114 is coupled to a Q2 PWM signal on a line 118 from the control circuit 76. The outputs of the AND gates are in turn the signals shown as the top two waveforms of FIG. 5.

It can be seen that the circuitry exclusive of the switch control circuit includes separate means for turning on the clamping switch and the first or second controlled switch between pulses in the second or first half-cycles of the inverter output current, respectively.

It should also be noted that, in the embodiment where the first and second controlled switches 56,58 comprise SCR's, commutation circuitry need not be utilized since the SCR's are naturally commutated by reversal of load current.

Figure 6:
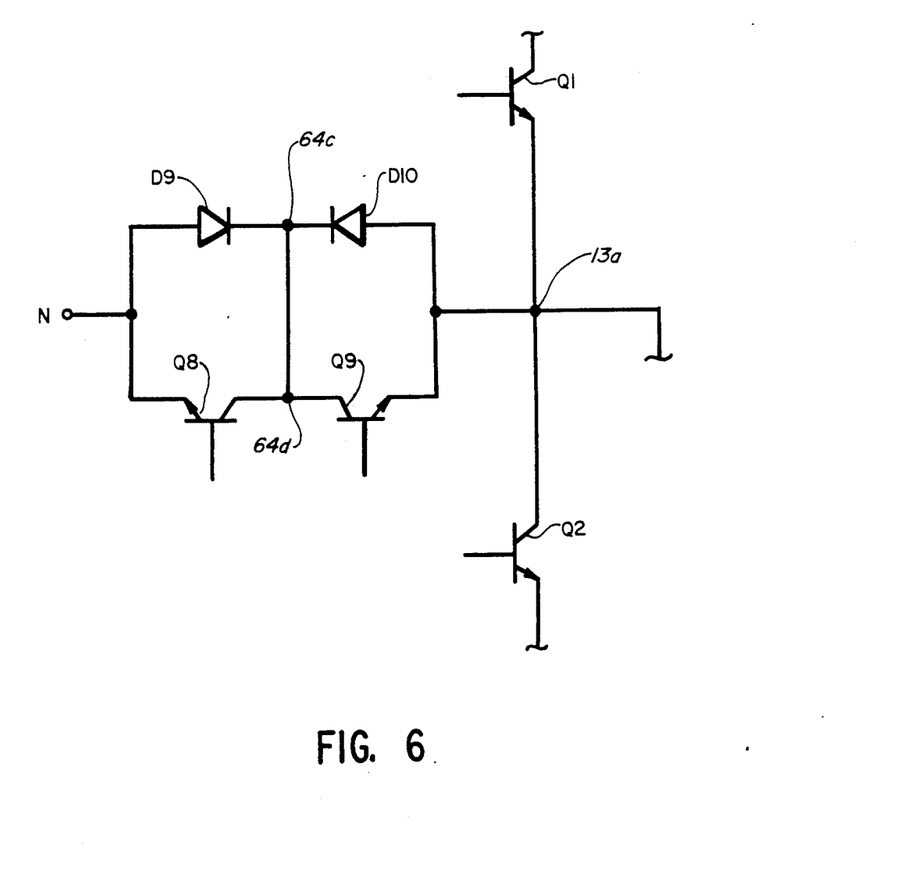
FIG. 6 is a simplified schematic diagram of an alternative embodiment of the invention.

Referring now to FIG. 6, there is illustrated an alternative embodiment of the invention which utilizes bipolar transistors Q8 and Q9 in place of the SCR's 56,58 shown in FIG. 3. In this embodiment, the switch Q7 can be eliminated entirely and nodes 64c and 64d can be connected together. Clamping is then accomplished by operation of the transistors Q8 and Q9 which are coupled to and controlled by the AND gates 94,98, FIG. 4. In effect, the transistors Q8 and Q9 alternately function as clamping switches in successive half-cycles of the inverter output voltage. It should be noted that in this embodiment the monostable 110 and AND gates 112,114 would not be needed and the control signals for the switches Q1,Q2 may be the signals on the lines 116, 118 from the PWM switch control circuit 76. The delay periods $t_{d1}$ and $t_{d2}$ are thereby eliminated as they are not necessary.

The present invention permits the delays between turn-off of one power switch and turn-on of the neutral or clamping switch, and vice versa, to be substantially reduced or eliminated, in turn leading to an increase in the quality of the output power produced by the inverter and a reduction in the size of snubber circuits used therewith.

We claim:

1. A bi-directional switch for use in a neutral point clamped PWM inverter which develops alternating output current and voltage comprising alternating first and second voltage and current half-cycles, the inverter having a pair of series-connected main power switches which are coupled across first and second voltages developed by first and second series-connected DC power sources, the first main power switch being intermittently operated in only the first half-cycles of the output voltage to develop a first series of pulses at an output junction between the main power switches and the second main power switch being intermittently operated in only the second half-cycles of the output voltage to develop a second series of pulses at the junction, comprising:

a clamping switch having main current path electrodes coupled between the main power switches and a neutral voltage developed at a junction between the first and second power sources and further including a control electrode;

means coupled to the control electrode of the clamping switch for operating the clamping switch between pulses in the first and second series of pulses to intermittently connect the inverter output to the junction between the first and second power sources so that load current flows between such junction and the load; and means coupled to the clamping switch for providing a high impedance path between the first voltage and the neutral voltage and between the second voltage and the neutral voltage so that shorting of the power sources is avoided even when one of the main power switches and the clamping switch are both in an on state.

2. The bi-directional switch of claim 1, wherein the providing means comprises a first controlled switch coupled between the junction between the power sources and one main current path electrode of the clamping switch and a second controlled switch coupled between the junction between the main power switches and the one main current path electrode of the clamping switch.

3. The bi-directional switch of claim 2, wherein the first and second controlled switches comprise SCR's wherein the first SCR is poled to conduct current from the clamping switch to the junction between the power sources and the second SCR is poled to conduct current from the clamping switch to the junction between the main power switches.

4. The bi-directional switch of claim 2, further including first means coupled to the controlled switches for turning on the second controlled switch when the clamping switch is operated in the first half-cycle of the output current and for turning off the first controlled switch in such first half-cycle and second means coupled to the controlled swtiches for turning on the first controlled switch when the clamping switch is operated in the second half-cycle of the output current and for turning off the second controlled switch in such second half-cycle.

5. The bi-directional switch of claim 4, wherein the controlled switches comprise SCR's and wherein each of the first and second turn on means includes means operative at a time of output current reversal at the end of a half-cycle of output current for inhibiting operation of the main power switches for a predetermined delay period following such half-cycle end and means for causing conduction of the clamping switch and the SCR other than that which was turned on in such half-cycle to provide a path for output current between the neutral voltage and the junction between the power switches.

6. The bi-directional switch of claim 4, wherein the controlled switches comprise transistors and wherein each of the first and second turn on means includes means operative at a time of output current reversal at the end of a half-cycle for immediately causing conduction of the main power switch other than that which was intermittently operated in such half-cycle to provide a path for such output current.

7. The bi-directional switch of claim 1, wherein the clamping switch comprises a bipolar transistor.

8. The bi-directional switch of claim 1, wherein the clamping switch comprises a MOSFET transistor.

9. A bi-directional switch for use in a neutral point clamped PWM inverter having a pair of series-connected main power switches which are coupled across a power supply and which are operated to produce an output at a junction therebetween, comprising:

a bridge including first and second diodes in first and second arms of the bridge and first and second controlled switches in third and fourth arms of the bridge, the bridge further including first through fourth vertices at the junctions between arms, the first vertex between the first and third arms being coupled to a neutral voltage and the second vertex between the second and fourth arms being coupled to the junction between the main power switches;

a clamping switch having main current path electrodes coupled between the third and fourth vertices of the bridge; and means for controlling the first and second controlled switches and the clamping switch alternately with the main power switches to prevent shorting of the power supply.

10. The bi-directional switch of claim 9, wherein the controlled switches of the bridge comprise SCR's.

11. The bi-directional switch of claim 9, wherein the controlled switches of the bridge comprise transistors.

12. The bi-directional switch of claim 9, wherein the inverter delivers alternating output current and voltage to a load and wherein the controlling means includes first means for operating one of the main power switches intermittently in a first half-cycle of the output voltage to develop a series of pulses of a first polarity, second means for operating the other of the main power switches intermittently in a second half-cycle of the output voltage to develop a series of pulses of a second polarity opposite the first polarity and third means for operating the clamping switch and one of the first and second controlled switches between pulses in the output voltage.

13. The bi-directional switch of claim 12, wherein the third operating means includes first means for turning on the clamping switch and the second controlled switch between pulses during the first half-cycle of the output current and second means for turning on the clamping switch and the first controlled switch between pulses during the second half-cycle of the output current.

14. The bi-directional switch of claim 13, wherein the controlled switches of the bridge comprise SCR's.

15. The bi-directional switch of claim 14, wherein the second turn on means includes means operative at a time of each current reversal at the end of a half-cycle of output current for inhibiting operation of the main power switches for a predetermined delay period following such half-cycle end and means for gating into conduction the clamping switch and the SCR other than that which was turned on in such half-cycle to provide a path for load current to the neutral voltage.

16. The bi-directional switch of claim 13, wherein the controlled switches of the bridge comprise transistors.

17. The bi-directional switch of claim 16, wherein the second turn on means includes means operative at a time of load current reversal at the end of a half-cycle of output current for immediately causing conduction of the main power switch other than that which intermittently operated in such half-cycle to provide a path for such load current.

18. The bi-directional switch of claim 9, wherein the clamping switch comprises a bipolar transistor.

19. A bi-directional switch for use in a neutral point clamped PWM inverter which develops alternating output current and voltage comprising alternating first and second voltage and current half-cycles, the inverter having a pair of series-connected main power switches which are coupled across first and second voltages developed by first and second series-connected DC power sources, the first main power switch being intermittently operated in only the first half-cycles of the output voltage to develop a first series of pulses at an output junction between the main power switches and the second main power switch being intermittently operated in only the second half-cycles of the output voltage to develop a second series of pulses at the junction, comprising:
a bridge including first and second diodes in first and second arms of the bridge and first and second SCR's in third and fourth arms of the bridge, the bridge further including first through fourth vertices at the junctions between arms, the first vertex at the junction between the cathode of the first SCR and the anode of the first diode being coupled to a neutral voltage at the junction between the power sources, the second vertex at the junction between the cathode of the second SCR and the anode of the second diode being coupled to the junction between the main power switches;
a clamping transistor having a first main current path electrode coupled to the third vertex at the junction between the cathodes of the first and second diodes, a second main current path electrode coupled to the fourth vertex at the junction between the anodes of the first and second SCR's and a control electrode; and
means coupled to the control electrode of the clamping transistor and to the SCR's for controlling the clamping transistor and the SCR's such that the clamping switch and the second SCR are turned on between pulses during each first half-cycle of the output current and the first SCR is maintained in an off condition during such half-cycles and the clamping switch and the first SCR are turned on between pulses during each second half-cycle of the output current and the second SCR is maintained in an off condition during such half-cycles.

20. The bi-directional switch of claim 19, wherein the controlling means includes means operative at a time of output current reversal at the end of a half-cycle of output current for inhibiting operation of the main power switches for a predetermined delay period following such half-cycle end and means for causing conduction of the clamping switch and the SCR other than that which was turned on in such half-cycle to provide a path for output current between the neutral voltage and the junction between the power switches.

21. A bi-directional switch for use in a neutral point clamped PWM inverter having a pair of series-connected main power switches which are coupled across a power supply and which are operated to produce an output at a junction therebetween, comprising:
a bridge including first and second diodes in first and second arms of the bridge and first and second transistors in third and fourth arms of the bridge, the bridge further including first and second vertices at the junctions between arms, the first vertex between the first and third arms being coupled to a neutral voltage and the second vertex between the second and fourth arms being coupled to the junction between the main power switches; and
means for controlling the first and second controlled switches alternately with the main power switches to prevent shorting of the power supply.

22. The bi-directional switch of claim 21, wherein the bridge further includes third and fourth vertices at the junction between the first and second arms and at the junction between the third and fourth arms, respectively, whereby the third and fourth vertices are coupled together.

23. The bi-directional switch of claim 22, wherein the inverter delivers alternating output current and voltage to a load and wherein the controlling means includes first means for operating one of the main power switches intermittently in a first half-cycle of the output voltage to develop a series of pulses of a first polarity, second means for operating the other of the main power switches intermittently in a second half-cycle of the output voltage to develop a series of pulses of a second polarity opposite the first polarity and third means for operating one of the first and second controlled switches between pulses in the output voltage.

* * * * *